(12) United States Patent
Nellen (10) Patent No.: US 9,375,998 B2
(45) Date of Patent: Jun. 28, 2016

(54) OPEN ROOF CONSTRUCTION FOR A VEHICLE

(71) Applicant: Inalfa Roof Systems Group B.V., Venray (NL)

(72) Inventor: Marcel Johan Christiaan Nellen, Merselo (NL)

(73) Assignee: Inalfa Roof Systems Group B.V., Oostrum (NL)

( * ) Notice: Subject to any disclaimer, the term of this patent is extended or adjusted under 35 U.S.C. 154(b) by 0 days.

(21) Appl. No.: 13/796,634

(22) Filed: Mar. 12, 2013

(65) Prior Publication Data

US 2013/0241244 A1 Sep. 19, 2013

(30) Foreign Application Priority Data

Mar. 19, 2012 (EP) .................................... 12160056

(51) Int. Cl.
*B60J 7/02* (2006.01)
*B60J 7/00* (2006.01)

(52) U.S. Cl.
CPC . *B60J 7/02* (2013.01); *B60J 7/0007* (2013.01)

(58) Field of Classification Search
CPC ..................................... B60J 7/02; B60J 7/043
USPC .............................. 296/216.01–224, 213–215
See application file for complete search history.

(56) References Cited

U.S. PATENT DOCUMENTS

| | | | | |
|---|---|---|---|---|
| 4,688,848 A | * | 8/1987 | Niwa ....................... | 296/216.03 |
| 5,058,947 A | * | 10/1991 | Huyer ...................... | 296/216.03 |
| 5,527,085 A | * | 6/1996 | Ochiai et al. ............... | 296/223 |
| 6,224,146 B1 | * | 5/2001 | Willard et al. ............. | 296/216.03 |
| 7,182,400 B2 | * | 2/2007 | Grimm et al. ............. | 296/216.08 |
| 7,445,276 B2 | * | 11/2008 | Gonzalez Merino et al. | 296/214 |
| 8,118,356 B2 | * | 2/2012 | Holzel ..................... | 296/216.03 |
| 8,444,217 B2 | * | 5/2013 | Nellen et al. ................ | 296/223 |
| 2004/0160082 A1 | * | 8/2004 | Bohm et al. ................ | 296/97.11 |
| 2005/0001457 A1 | | 1/2005 | Bohm et al. | |

(Continued)

FOREIGN PATENT DOCUMENTS

| | | |
|---|---|---|
| DE | 3424332 | 1/1986 |
| DE | 3817391 A1 | 12/1988 |

(Continued)

OTHER PUBLICATIONS

European Search Report of the European Patent Office Patent Office in counterpart foreign application No. EP 12160056.3 filed Mar. 19, 2012.

(Continued)

*Primary Examiner* — Dennis H Pedder (74) *Attorney, Agent, or Firm* — Steven M. Koehler; Westman, Champlin & Koehler, P.A.

(57) ABSTRACT

An open roof construction for a vehicle is provided, comprising a roof opening in a stationary roof part, a movable panel for opening and closing said roof opening and two panel operating assemblies positioned at two opposite longitudinal sides of the roof opening. As seen in the longitudinal direction of the vehicle, the panel operating assemblies have a varying width in the transverse direction of the vehicle. In one embodiment the width of the panel operating assemblies varies in a gradual and/or step-wise fashion. In another embodiment the width of the panel operating assemblies decreases in a forward and/or backward direction of the vehicle.

12 Claims, 5 Drawing Sheets

(56) References Cited

U.S. PATENT DOCUMENTS

2005/0200165 A1* 9/2005 Grimm et al. ............ 296/216.04
2010/0225147 A1   9/2010 Lenkens
2011/0266839 A1* 11/2011 Sasaki et al. .................. 296/219

FOREIGN PATENT DOCUMENTS

| DE | 10331269 | A1 | 1/2005 |
|----|----------|----|--------|
| EP | 1577136  | A2 | 9/2005 |
| EP | 2226209  |    | 9/2010 |
| FR | 2947488  | A1 | 1/2011 |
| JP | S60143126 |   | 7/1985 |

OTHER PUBLICATIONS

Communication pursuant to Article 94(3) EPC for corresponding foreign application EP2641761, filed Sep. 25, 2013, mailed Apr. 14, 2015.

* cited by examiner

Fig.1

Prior Art

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to an open roof construction for a vehicle, comprising a roof opening in a stationary roof part, a movable panel for opening and closing said roof opening and two panel operating assemblies positioned at two opposite longitudinal sides of the roof opening.

In a known open roof construction of this type the panel operating assemblies substantially everywhere over their length, as seen in the longitudinal direction of the vehicle, occupy substantially the same amount of space in a transverse direction of the vehicle.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

According to an aspect of the present invention an open roof construction is provided in which, as seen in the longitudinal direction of the vehicle, the panel operating assemblies have a varying width in the transverse direction of the vehicle.

It has appeared that, although known panel operating assemblies substantially everywhere over their length, as seen in the longitudinal direction of the vehicle, occupy substantially the same amount of space in a transverse direction of the vehicle (meaning that they have substantially a constant width in said transverse direction along their entire length), such a shape of the panel operating assemblies in many cases is not necessary for achieving the desired functionality of said assemblies (and only is a result of the desire to achieve an ease of manufacturing, because no complicated longitudinally varying shape of the assemblies has to be produced). For example, in some instances forward and rearward parts of such assemblies operate in different manners and, for that, include members with different requirements with respect to minimal width. Thus the present invention provides an open roof construction in which the local width of the panel operating assemblies varies, for example such that these panel operating assemblies for the greater part only are as wide locally as constructively (or functionally) required. The additional space that becomes available in places in which the panel operating assemblies have a smaller width, may be used in a favorable manner to amend and/or improve other items of the open roof construction.

In one embodiment of the open roof construction the width of the panel operating assemblies varies in a gradual and/or step-wise fashion. Thus, the panel operating assembly may comprise any desired combination of parts with different widths and parts with gradually varying width. For example, a first length may have a first width whereas a second length has a second width; or a first length has a first width, a second length has a second width and an intermediate length has a width varying from the first to the second length.

In another embodiment the width of the panel operating assemblies decreases in a forward and/or backward direction of the vehicle. For example (representing the most practical embodiment), a rearward part of the assemblies may be wider than a forward part.

In one embodiment the open roof construction according to the present invention further is provided with a movable blind for cooperation with the roof opening and two blind guides positioned at two opposite longitudinal sides of the roof opening, wherein each blind guide at least partly follows the contour provided by the varying width of a corresponding one of the panel operating assemblies.

Thus, in such an embodiment the additional free space which is created by the less wider parts of the panel operating assemblies is at least partly occupied by the corresponding blind guides, such that the overall width of the combination of a panel operating assembly and corresponding blind guide may be minimised at said less wider parts of the panel operating assemblies, with concurrent constructive advantages.

In yet another embodiment of the open roof construction according to the present invention, the panel operating assemblies extend substantially in the longitudinal direction of the vehicle, wherein the width of said panel operating assemblies varies such that, as seen in the longitudinal direction of the vehicle, the distance between corresponding innermost parts of said panel operating assemblies varies. This means that the additional space created by the less wider parts of the assemblies is obtained inwardly from said assemblies.

The previous embodiment, for example, may be applied to an open roof construction for a vehicle type of which the roof has an outer contour diverging in a forward direction of the vehicle and is provided with a movable blind for cooperation with the roof opening and two blind guides positioned at two opposite longitudinal sides of the roof opening and inwardly from the respective panel operating assemblies, wherein said blind guides substantially extend in parallel to said outer contour.

As a result an open roof construction is obtained in which both panel operating assemblies (which cooperate with the same panel) extend in parallel (keeping the complexity of the construction of these assemblies as low as possible), while the blind guides diverge in the forward direction of the vehicle, which offers the possibility of providing a roof opening—and an inner head liner at the top of the passenger compartment of the vehicle surrounding the roof opening—of which the contour follows the outer diverging contour—the so called cantrail—of the roof of the vehicle. As a result a larger roof opening may be accomplished allowing an improved entry of daylight into the passenger compartment, whereas further esthetical benefits may be obtained.

Each blind guide may extend in a curved line or in a straight line, depending on the circumstances.

In another embodiment of the open roof construction the panel operating assemblies, as seen in the longitudinal direction of the vehicle, extend such along a curved line that, as seen in said longitudinal direction of the vehicle, also the distance between corresponding outermost parts of said panel operating assemblies varies. In this case additional space created by the less wider parts of the assemblies also is obtained outwardly from said assemblies. It is noted that in such an embodiment the panel operating assemblies still may be considered as extending substantially (but not exactly) in the longitudinal direction of the vehicle.

Such an embodiment, for example, may be applied to an open roof construction for a vehicle type of which the roof has an outer contour converging in a backward direction of the vehicle and provided with a movable blind for cooperation with the roof opening and two blind guides positioned at two opposite longitudinal sides of the roof opening and inwardly from the respective panel operating assemblies, wherein said blind guides extend substantially in the longitudinal direction of the vehicle whereas the panel operating assemblies extend substantially in parallel to said outer contour.

As such an open roof construction is obtained in which both panel operating assemblies (which cooperate with the same panel) do not extend in parallel but follow the outer converging contour of the roof (which results in the possibility of positioning the opposite panel operating assemblies at a larger transverse distance from each other, while the blind guides extend in parallel (keeping low the complexity of the blind mechanism).

In another embodiment of the open roof construction according to the present invention the panel operating assemblies each comprise a panel guide and a panel moving mechanism, wherein the panel moving mechanism is not present at least at the part of a panel operating assembly with the smallest width. This means that the panel moving mechanism (possibly in combination with the panel guide) defines the largest width of the panel operating assembly, whereas the smallest width thereof is defined by the panel guide. For example, such a panel guide may be used to guide a forward part of the panel, whereas the panel moving mechanism may comprise a lifting arm cooperating with a more rearward part of the panel.

In the previous embodiment the panel guide may extend along the entire length of the panel operating assembly or may extend along part of the length of the panel operating assembly, depending on the constructive and/or functional demands of the open roof construction.

Further it is possible that the panel guide and panel moving mechanism of a panel operating assembly are integrally interconnected to form a single unitary part. This means that both parts are made into a single unitary part during the initial manufacture of the panel operating assembly.

In contrast thereto it is conceivable too that the panel guide and panel moving mechanism of a panel operating assembly define two separate parts interconnected using any type of connecting method. This means that both parts are manufactured independently and only afterwards are interconnected by any appropriate means (for example, but not exclusively, using mechanical fasteners such as screws, bolts, rivets or by welding, soldering or adhesive).

BRIEF DESCRIPTION OF THE DRAWINGS

Hereinafter aspects of the invention will be elucidated while referring to the drawing, in which.

DETAILED DESCRIPTION OF THE ILLUSTRATIVE EMBODIMENTS

Figure 1:
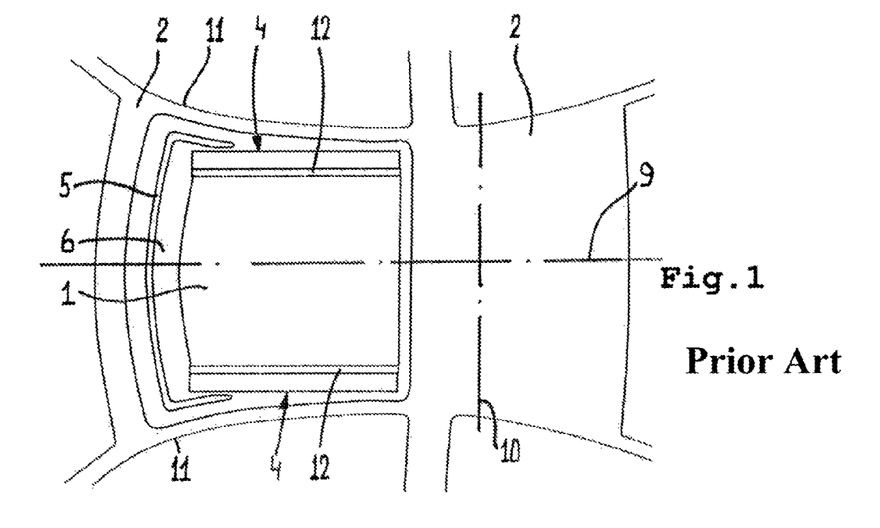
FIG. 1 schematically shows a partial top plan view of a vehicle provided with a state of the art open roof construction.

Firstly referring to FIG. 1 a state of the art open roof construction for a vehicle is shown comprising a roof opening 1 in a stationary roof part 2. A roof assembly includes a movable panel 3 (only illustrated in FIG. 3) for opening and closing said roof opening and two panel operating assemblies 4 positioned at two opposite longitudinal sides of the roof opening 1. The inner boundaries of the assemblies 4 may or may not coincide with the respective longitudinal edges of the roof opening 1. In front of the roof opening a wind deflector 5 has been illustrated. Further this figure shows part of a head liner 6 which also extends sideward of the roof opening 1 at the inner side of the stationary roof 2.

The panel operating assemblies 4 each are responsible for part of the movement of the panel 3 between its open and closed positions. From FIG. 1 it follows that the assemblies 4 over their entire length (as seen in the longitudinal direction 9 of the vehicle) have a constant width in the transverse direction 10 of the vehicle.

Further FIG. 1 shows two blind guides 12 positioned at two opposite longitudinal sides of the roof opening 1 and inwardly from the assemblies 4 for guiding a movable blind 13 (only shown schematically in FIG. 3) for cooperation with the roof opening 1. Opposite edges of the blind 13 are guided by the blind guides 12, discussed below. The specific construction of guiding edges of the blind 13 can take numerous forms the details of which are not pertinent to the aspects of the present invention, but are known in the art.

The effective dimension (especially width) of the roof opening 1 is limited by the blind guides 12 (of which the position is determined by the innermost parts of the assemblies 4) and does not favor from an outwardly diverging contour 11 of the stationary roof part 2 of the vehicle.

Figure 2:
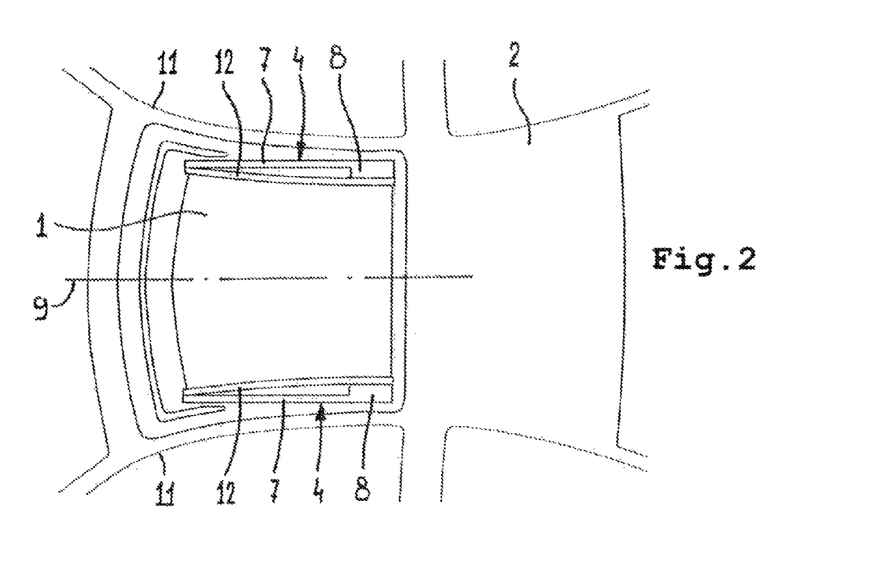
FIG. 2 schematically shows a partial top plan view of a vehicle provided with a first embodiment of the open roof construction.

Referring to FIG. 2 a first embodiment of the open roof construction and roof assembly is illustrated in which corresponding members have corresponding reference signs. As seen in the longitudinal direction 9 of the vehicle, each of the panel operating assemblies 4 has a varying width in the transverse direction of the vehicle. Specifically these assemblies each comprise a panel guide 7 and a panel moving mechanism 8. The panel moving mechanism 8 is not present at the part of a panel operating assembly 4 with the smallest width, but the panel guide 7 extends substantially along the entire length of the panel operating assembly 4.

The panel operating assemblies 4 extend substantially in the longitudinal direction of the vehicle and the width of said panel operating assemblies varies such that, as seen in the longitudinal direction of the vehicle, the distance between corresponding innermost parts of said panel operating assemblies varies.

Figure 3:
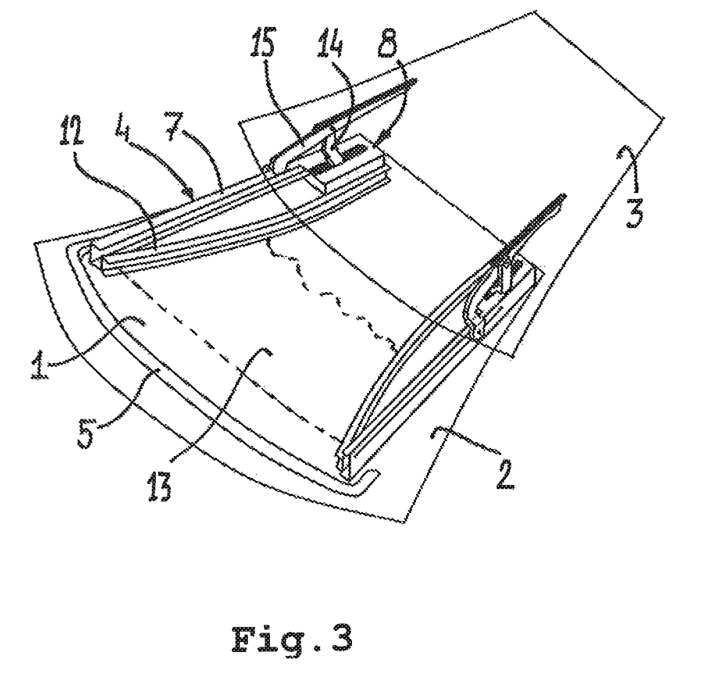
FIG. 3 schematically shows a perspective view of a roof assembly according to FIG. 2, and FIGS. 4-11 all schematically show partial top plan views of vehicles provided with different embodiments of the open roof construction.

At the forward (in the figure left) end of the panel moving mechanism 8 the width of the panel operating assemblies 4 changes in a step-wise fashion such that the width of the panel operating assembly 4 decreases in a forward direction of the vehicle. As a result the blind guides 12 diverge outwardly at one end and, if desired, at least partly can follow the contour provided by the varying width of a corresponding one of the panel operating assemblies 4 and thus an outer diverging contour 11 of the roof 2, offering the possibility of providing a larger roof opening 1. In this embodiment each blind guide 12 extends in a curved line. The blind guide 12 can be connected to part(s) of the panel operating assembly 4 or otherwise disposed in close proximity thereto FIG. 3 illustrates a perspective view of an embodiment of a roof assembly and an open roof construction in which some details are visible of some parts thereof. The panel moving mechanisms 8 comprise a lifting arm 14 which cooperates with a curve 15 which is attached to the panel 3 and of which a portion such as a forward end of the curve 15 is configured to be guided in the panel guide 7. Apart from the panel operating assembly 4 having the varying width, such a construction is well known and a further explanation is not needed.

Figure 4:
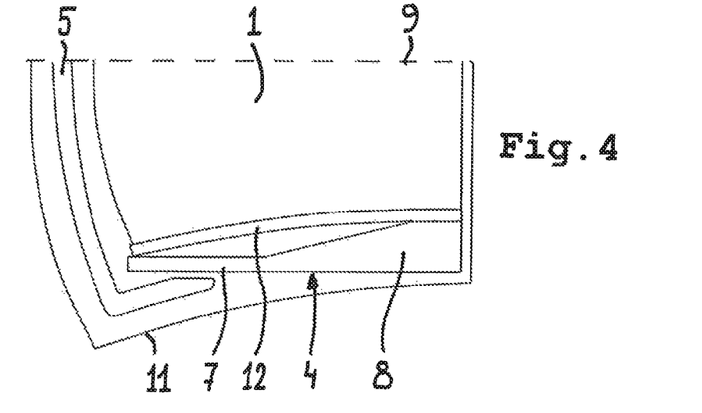

The embodiment according to FIG. 4 differs from that according to FIG. 2 in that now there is a gradual transition in width from the panel moving mechanism 8 towards the part of the assembly 4 where only the panel guide 7 is present.

Figure 5:
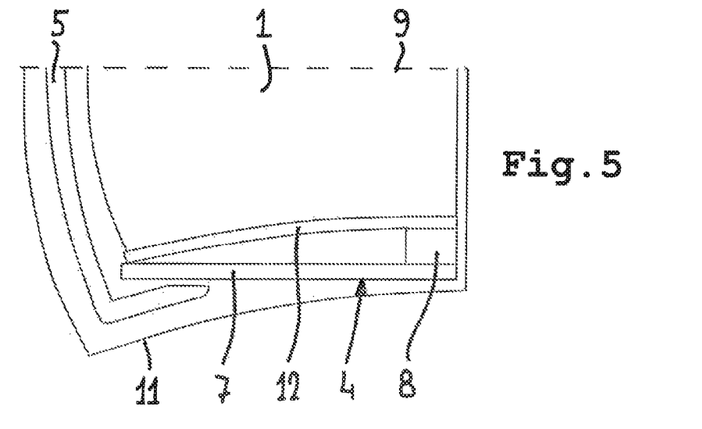
Figure 6:
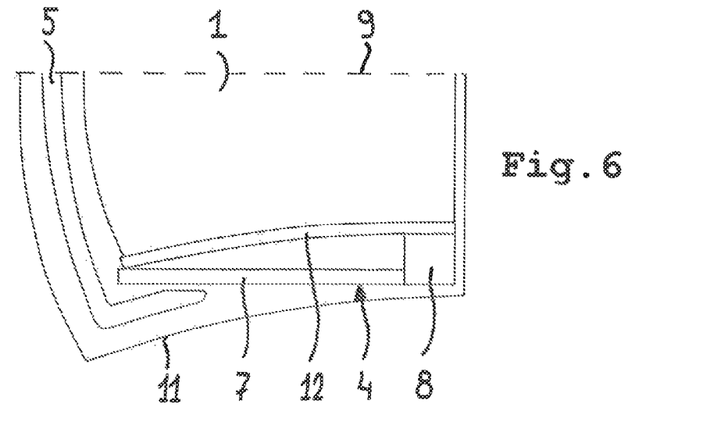

It is noted that the panel guide 7 may or may not extend over the entire length of the panel moving assembly 4. A first exemplary embodiment is illustrated in FIG. 5 and a second exemplary embodiment in FIG. 6. In both embodiments, however, there is a step-wise change in width of the assembly 4 (i.e. width of mechanism 8 versus width of guide 12). In the embodiments of FIGS. 4-6 each blind guide 12 again extends in a curved line to follow contour 11.

As a further difference FIG. 4 shows an embodiment in which the panel guide 7 and panel moving mechanism 8 of a panel operating assembly 4 are integrally interconnected to form a single unitary part, whereas FIGS. 5 and 6 illustrate embodiments in which both parts define separate parts interconnected using any type of connecting method (fasteners, adhesives, welding, etc.).

Figure 7:
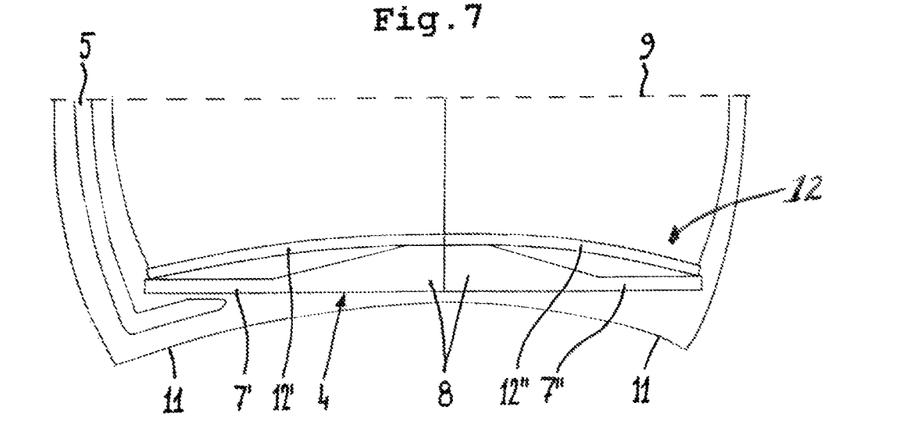

FIG. 7 illustrates an embodiment which comprises a forward section in accordance with FIG. 4 and a rearward section in correspondence with a mirror image of FIG. 4, combined into a single open roof construction with a central wider part of the panel moving assembly 4 with panel moving mechanism 8 and two panel guide sections 7' and 7" extending therefrom in a forward and backward direction of the vehicle. Likewise, a blind guide 12 herein having two blind guide sections 12' and 12" are provided. Thus, this embodiment is specifically fit for use in a vehicle with an outer contour 11 diverging in the forward direction as well as in the backward direction.

Figure 8:
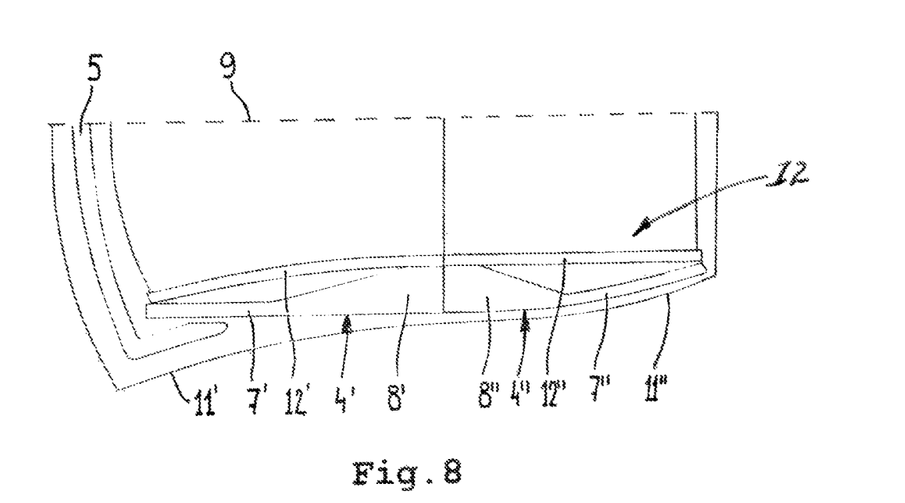

FIG. 8 shows an embodiment which again comprises a forward section in accordance with FIG. 4 with panel moving mechanism 8', panel guide section 7' and blind guide section 12' positioned inwardly from the assembly section 4'. The vehicle has an outer contour 11' diverging in the forward direction. However, the vehicle also has an outer contour 11" converging in the backward direction. In this embodiment the open roof construction further comprises a rearward section of which the panel operating assembly sections 4" (only one illustrated), as seen in the longitudinal direction 9 of the vehicle, extend such along a curved line that, as seen in said longitudinal direction of the vehicle, also the distance between corresponding outermost parts of said panel operating assembly sections 4" varies. This rearward section comprises a panel moving mechanism 8", panel guide section 7" and a blind guide section 12" positioned inwardly again from the respective panel operating assembly section 4" and extending in parallel to the longitudinal direction 9 of the vehicle.

Because the assembly section 4" is curved inwardly (i.e. sections 4" on each side converging toward each other), it is possible to position the entire assembly 4',4" closer to the outer edge of the roof, thus increasing the distance between the opposite assemblies 4',4" and allowing a wider roof opening. Because, further, the width of said assembly sections 4" also is diminished at the inward side thereof, the inward curve of these assemblies does not influence the position of the blind guide sections 12" (specifically, these do not have to be curved inwardly too).

Figure 9:
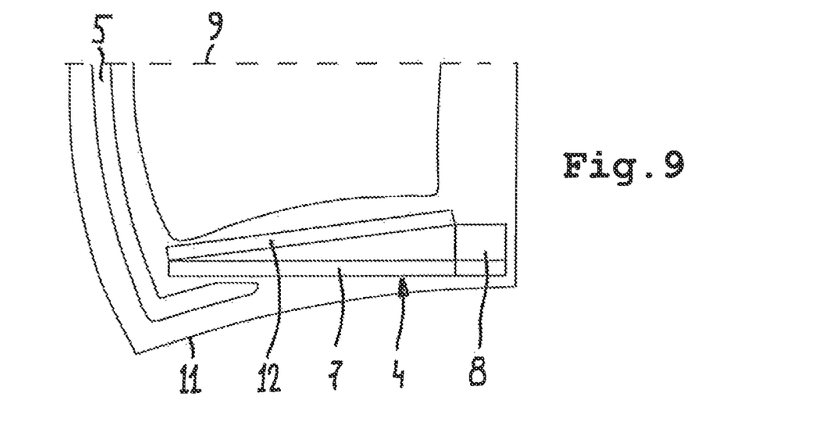

FIG. 9 shows an embodiment in which the blind guide 12 extends in a straight line but outwardly in a forward direction of the vehicle, thus only generally but not exactly following the outer contour 11 of the roof 2 (i.e. the blind guides 12 on each side diverge away from each other).

Figure 10:
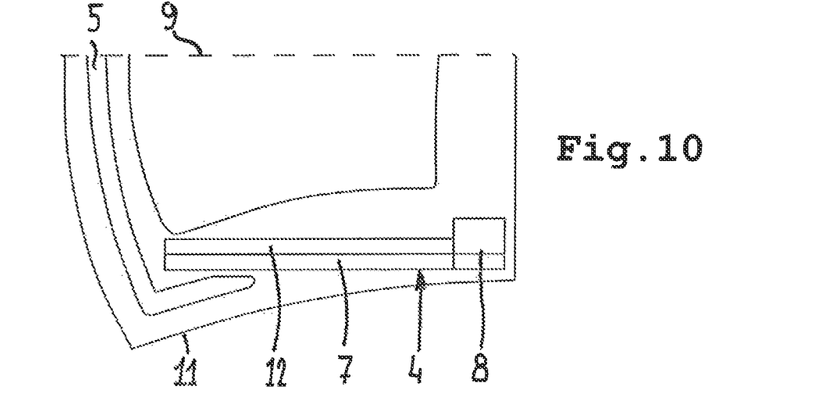

In FIG. 10 a special embodiment is illustrated in which the blind guide 12 is located entirely in the space created by the smaller width of the panel operating assembly 4 (i.e. the portion of the panel operating assembly having a width less than the transverse width of panel moving mechanism 8). Although shown as abutting the panel guide 7, the blind guide 12 also may be spaced from the panel guide 7 and still reside in the portion of panel operating assembly 4 having a transverse width less than the panel moving mechanism 8.

Figure 11:
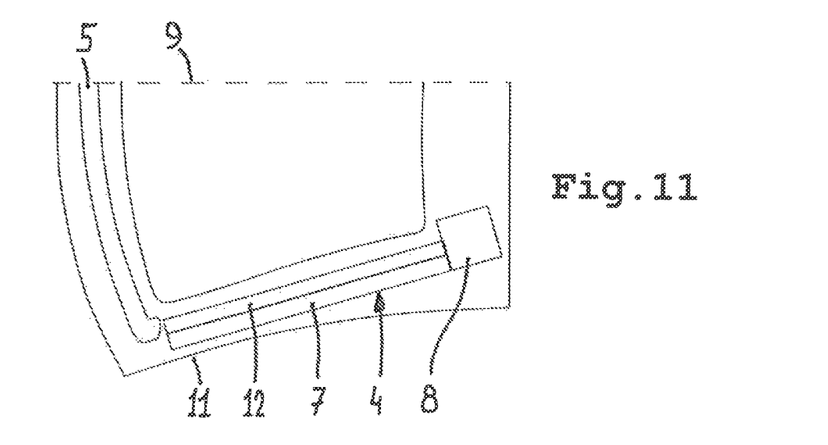

Finally FIG. 11 illustrates an embodiment somewhat similar to FIG. 10, but in this embodiment both the panel guide 7 and blind guide 12 extend inclined relative to the longitudinal direction 9 (i.e. where the panel guides 7 and blind guides 12 diverge away from each other), whereas in FIG. 10 the panel guides 7 and the blind guides 12 extend in parallel thereto.

Although the subject matter has been described in language specific to structural features and/or methodological acts, it is to be understood that the subject matter defined in the appended claims is not necessarily limited to the specific features or acts described above as has been held by the courts. Rather, the specific features and acts described above are disclosed as example forms of implementing the claims.

What is claimed is:

1. An open roof construction for a vehicle, comprising:
a roof opening in a stationary roof part, a movable panel for opening and closing said roof opening and two panel operating assemblies;
a panel operating assembly being positioned at each of two opposite longitudinal sides of the roof opening, wherein, along a longitudinal direction of the vehicle, the panel operating assemblies each having a varying width in a direction transverse to the longitudinal direction of the vehicle in a gradual and/or step-wise fashion,
wherein each of the two panel operating assemblies at a first longitudinal position has a first stationary component configured to be fixedly secured to the stationary roof part that has a first component width in the direction transverse to the longitudinal direction of the vehicle and that cooperates with a first member to movably support the movable panel, the first stationary roof component extending longitudinally along the roof opening;
wherein each of the two panel operating assemblies at a second longitudinal position has a second stationary component configured to be fixedly secured to the stationary roof part that has a second component width in the direction transverse to the longitudinal direction of the vehicle and that cooperates with a second member to movably support the movable panel,
wherein the first component width is less than the second component width, and
wherein the panel assemblies are configured to support the panel on the stationary roof with a first transverse spacing between the first stationary components at the first longitudinal position being larger than a second transverse spacing between the second stationary components at the second longitudinal position; and
a movable blind for cooperation with the roof opening and two blind guides positioned at two opposite longitudinal sides of the roof opening, wherein each blind guide at least partly follows a contour provided by the varying width of a corresponding one of the panel operating assemblies.

2. The open roof construction according to claim 1 for a vehicle type of which the roof has an outer contour diverging in a forward direction of the vehicle, wherein said blind guides substantially extend in parallel to said outer contour of the roof.

3. The open roof construction according to claim 2, wherein each blind guide extends in a curved line or in a straight line.

4. An open roof construction for a vehicle, comprising a roof opening in a stationary roof part, a movable panel for opening and closing said roof opening and two panel operating assemblies, a panel operating assembly being positioned at each of two opposite longitudinal sides of the roof opening, wherein, along a longitudinal direction of the vehicle, the panel operating assemblies each having a varying width in a direction transverse to the longitudinal direction of the vehicle,
   wherein each of the two panel operating assemblies at a first longitudinal position has a first stationary component configured to be fixedly secured to the stationary roof part that has a first component width in the direction transverse to the longitudinal direction of the vehicle and that cooperates with a first member to movably support the movable panel, the first stationary roof component extending longitudinally along the roof opening;
   wherein each of the two panel operating assemblies at a second longitudinal position has a second stationary component configured to be fixedly secured to the stationary roof part that has a second component width in the direction transverse to the longitudinal direction of the vehicle and that cooperates with a second member to movably support the movable panel,
   wherein the first component width is less than the second component width,
   wherein the panel operating assemblies are configured to support the panel on the stationary roof with a first transverse spacing between the first stationary components at the first longitudinal position being larger than a second transverse spacing between the second stationary components at the second longitudinal position, and
   wherein the panel operating assemblies extend in the longitudinal direction of the vehicle along a curved line such that the distance between corresponding outermost parts of said panel operating assemblies varies.

5. The open roof construction according to claim 4 for a vehicle type of which the roof has an outer contour converging in a backward direction of the vehicle and the roof construction further comprises a movable blind for cooperation with the roof opening and two blind guides, a blind guide being positioned at each of two opposite longitudinal sides of the roof opening and inwardly from the respective panel operating assembly, wherein said blind guides extend substantially in the longitudinal direction of the vehicle whereas the panel operating assemblies extend substantially in parallel to said outer contour.

6. An open roof construction for a vehicle, comprising:
   a roof opening in a stationary roof part;
   a movable panel for opening and closing said roof opening and two panel operating assemblies;
   a panel operating assembly being positioned at each of two opposite longitudinal sides of the roof opening, wherein, along a longitudinal direction of the vehicle, the panel operating assemblies each having a varying width in a direction transverse to the longitudinal direction of the vehicle,
   wherein each of the two panel operating assemblies at a first longitudinal position has a first stationary component configured to be fixedly secured to the stationary roof part that has a first component width in the direction transverse to the longitudinal direction of the vehicle and that cooperates with a first member to movably support the movable panel, the first stationary roof component extending longitudinally along the roof opening;
   wherein each of the two panel operating assemblies at a second longitudinal position has a second stationary component configured to be fixedly secured to the stationary roof part that has a second component width in the direction transverse to the longitudinal direction of the vehicle and that cooperates with a second member to movably support the movable panel,
   wherein the first component width is less than the second component width,
   wherein the panel operating assemblies are configured to support the panel on the stationary roof with a first transverse spacing between the first stationary components at the first longitudinal position being larger than a second transverse spacing between the second stationary components at the second longitudinal position,
   wherein the panel operating assemblies each comprise a panel guide as the first stationary component and a panel moving mechanism as the second stationary component and wherein the panel moving mechanism is not present at least at the part of a panel operating assembly with the smallest width, and
   wherein the panel guide extends along the entire length of the panel operating assembly.

7. The open roof construction according to claim 6, wherein the panel guide and panel moving mechanism of a panel operating assembly are integrally interconnected to form a single unitary part.

8. The open roof construction according to claim 6, wherein the panel guide and panel moving mechanism of a panel operating assembly define two separate interconnected parts.

9. A roof assembly comprising:
   a movable panel configured for opening and closing a roof opening in a vehicle; and
   two panel operating assemblies separated from each other, wherein a panel operating assembly is connected to a side of the movable panel and to a side of a stationary portion of the roof, wherein along a longitudinal length of each panel operating assembly, the panel operating assembly has a varying width,
   wherein each of the two panel operating assemblies at a first position has a first stationary component configured to be fixedly secured to the stationary portion of the roof that has a first component width in a direction transverse to the longitudinal direction of the vehicle and that cooperates with a first member to movably support the panel, the first stationary roof component extending longitudinally along the roof opening;
   wherein each of the two panel operating assemblies at a second position has a second stationary component configured to be fixedly secured to the stationary portion of the roof that has a second component width in the direction transverse to the longitudinal direction of the vehicle and that cooperates with a second member to movably support the panel,
   wherein the first component width is less than the second component width, wherein the panel operating assemblies are configured to support the movable panel on the stationary portion of the roof with a first transverse spacing between the first stationary components at the first position being larger than a second transverse spacing between the second stationary components at the second position, wherein each panel operating assembly comprises a panel moving mechanism as the second stationary component configured to lift and lower the movable panel, a panel guide as the first stationary component extending at least along some of the longitudinal length of the panel operating assembly and a curved member having a portion configured to be guided along the panel guide, and wherein the width of the panel moving mechanism is greater than the width of the associated panel guide.

10. The roof assembly of claim 9 and further comprising a movable blind configured to at least partially open and close the roof opening and a blind guide connected to each of the panel operating assemblies and configured to guide the movable blind along opposite edges thereof.

11. The roof assembly of claim 10 wherein a distance between the blind guides varies along the longitudinal lengths of the panel operating assemblies.

12. The roof assembly of claim 11 wherein a distance between the blind guides is less proximate the panel moving mechanisms than at ends of the panel guides remote from each corresponding panel moving mechanism.

\* \* \* \* \*